United States Patent [19]

Bruno

[11] Patent Number: 4,852,691
[45] Date of Patent: Aug. 1, 1989

[54] SCAFFOLDING BOARD FORMED FROM PLASTICS MATERIALS, A METHOD OF PRODUCING SAME, AND AN APPARATUS FOR IMPLEMENTING THE METHOD

[75] Inventor: Mueller Bruno, Grenchen, Switzerland

[73] Assignee: Polytex Plastic SA, Grenchen, Switzerland

[21] Appl. No.: 122,136

[22] Filed: Nov. 17, 1987

[30] Foreign Application Priority Data

Nov. 24, 1986 [EP] European Pat. Off. ........ 86810534.7

[51] Int. Cl.$^4$ .............................................. E04G 5/08
[52] U.S. Cl. .................................... 182/222; 182/46
[58] Field of Search ............... 182/228, 222, 223, 179, 182/178, 46

[56] References Cited

U.S. PATENT DOCUMENTS

| | | | |
|---|---|---|---|
| 3,884,328 | 5/1975 | Williams | 182/222 |
| 4,349,297 | 9/1982 | Misener | 182/222 |
| 4,496,029 | 1/1985 | Kuroda | 182/222 |
| 4,742,890 | 5/1988 | Blauw | 182/46 |

FOREIGN PATENT DOCUMENTS

| | | | |
|---|---|---|---|
| 1559034 | 8/1969 | Fed. Rep. of Germany . | |
| 1759177 | 1/1972 | Fed. Rep. of Germany . | |
| 2526620 | 12/1976 | Fed. Rep. of Germany | 182/222 |
| 3419494 | 11/1985 | Fed. Rep. of Germany . | |
| 2340187 | 9/1977 | France . | |
| 2457946 | 1/1981 | France | 182/222 |
| 1487302 | 9/1977 | United Kingdom | 182/46 |
| 2058188 | 4/1981 | United Kingdom . | |
| 2167340 | 5/1986 | United Kingdom . | |

*Primary Examiner*—Reinaldo P. Machado
*Attorney, Agent, or Firm*—Marks Murase & White

[57] ABSTRACT

The scaffolding board (21) is moulded from a compound, light-hardened, duroplastic material and, in one embodiment, it comprises a box-shaped upper portion (22) provided with grooving (24), a box-shaped intermediate portion (20) provided with longitudinal ribs (30), and a lower, also box-shaped edge trim (28), all three portions being glued together.

To produce the individual portions of the scaffolding board, a web of plastics material is clamped onto an air-permeable lower mould portion and filled with compressed-air, and the arched material is simultaneously heated and expanded. Subsequently, the lower mould portion is filled with vacuum, and the heated material is sucked-in and deep-drawn in order to adapt to the shape of the mould interior. Subsequently, the moulded part is exposed to a source of ultra-violet light and hence hardened. Finally, compressed-air is introduced in order to lift-out the hardened part.

The apparatus required therefor has a porous lower mould portion (1) and is provided with a compressed-air and vacuum connection (8, 9), these inlet connections extending into an annular, air-permeable conduit, and the entire lower mould portion (1), with the exception of the mould interior (3), is surrounded by an airtight casing (15).

Such a method and apparatus permit scaffolding boards to be produced in a very economical manner, such boards being substantially lighter in weight than conventional boards formed from wood or metal and, in addition, they comply with all the regulations regarding stability and tensile strength.

7 Claims, 5 Drawing Sheets

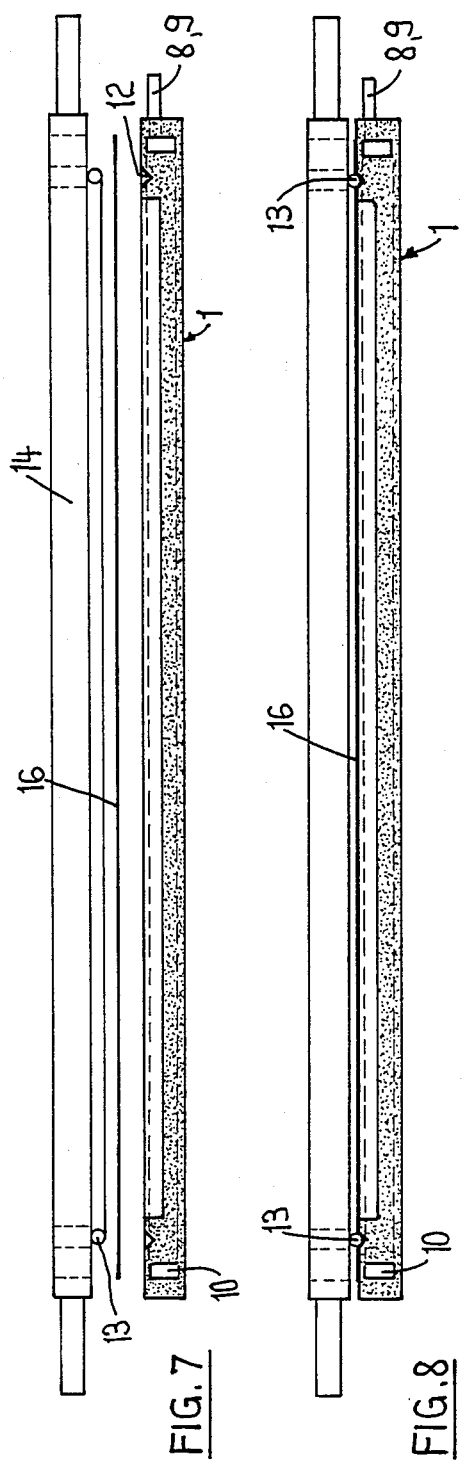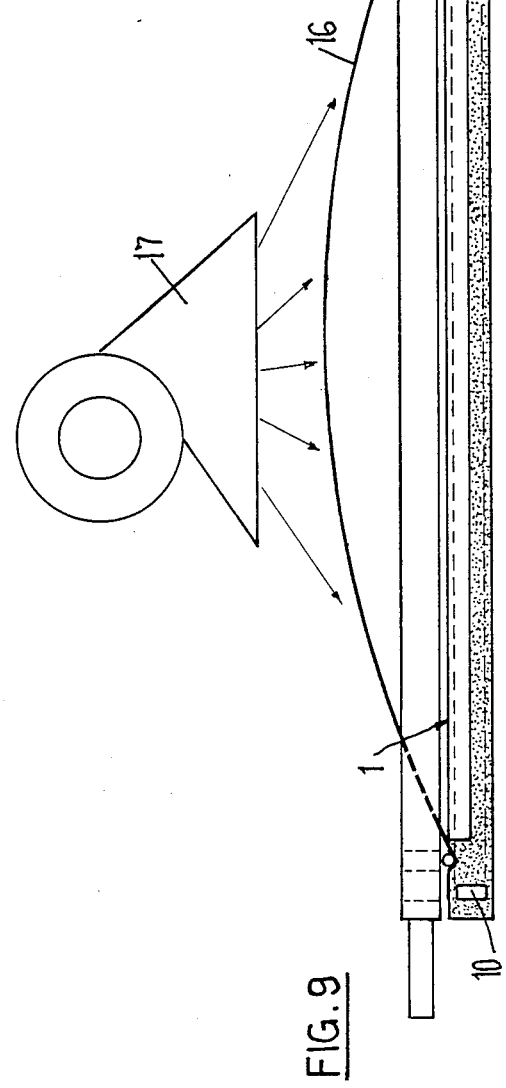

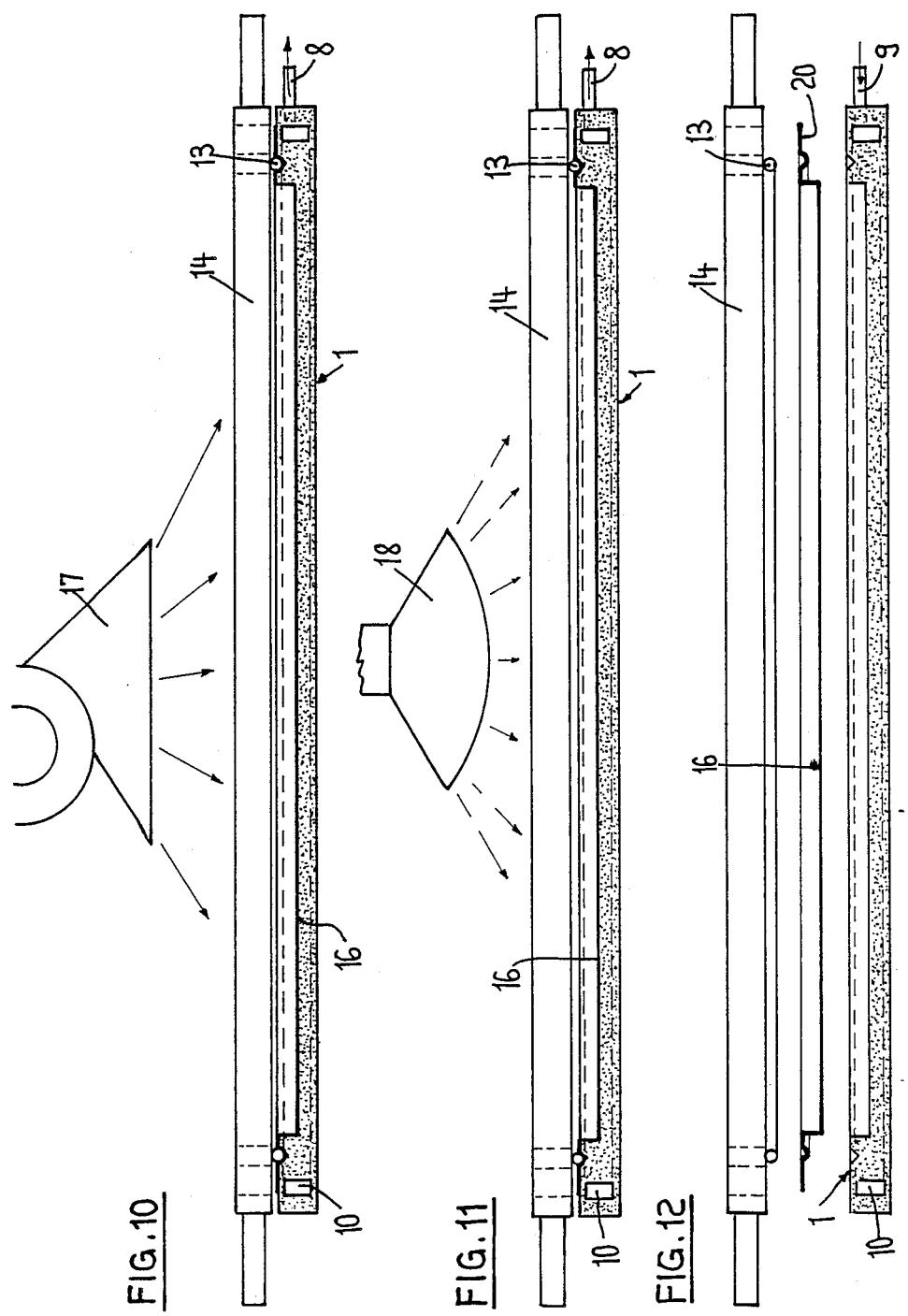

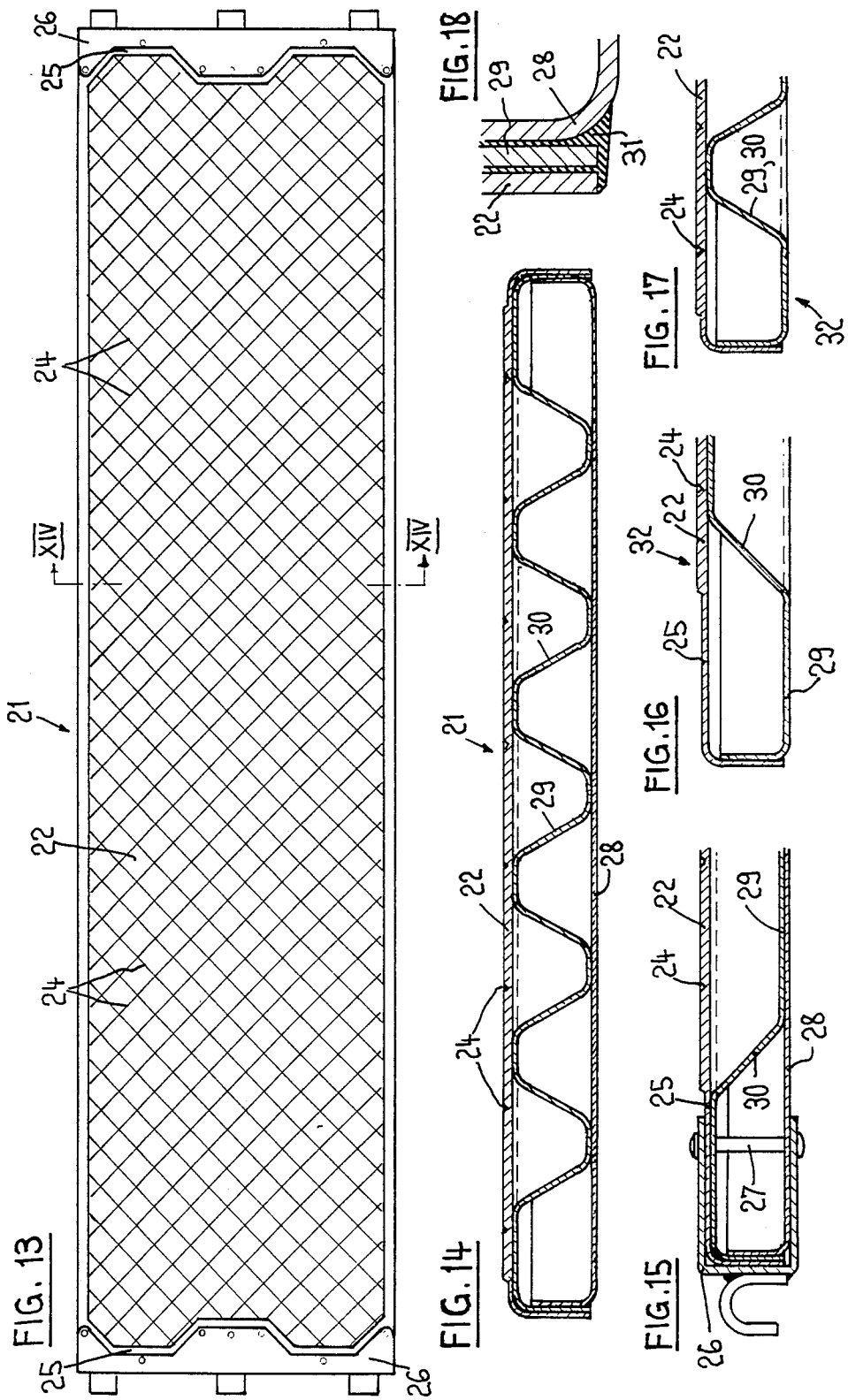

SCAFFOLDING BOARD FORMED FROM PLASTICS MATERIALS, A METHOD OF PRODUCING SAME, AND AN APPARATUS FOR IMPLEMENTING THE METHOD

Scaffolding boards formed from plastics material are only very rarely found on the market, if at all, although they could have considerable advantages, such as, for example, being substantially lighter in weight and having greater resistance to the effects of weather.

WO-84/04940 discloses a plastics material component which is formed from glass-fibre material and has structural elements disposed therein, the webs of glass-fibre material being placed in a Z-shaped manner around the structural elements. It has been shown that this method of production is very labour-expensive and has not yet achieved its goal, with the result that, up to the present point in time, i.e. up to the application date of this application, the scaffolding boards are formed to a greater extent from wood and to a lesser extent from metal, both types of boards being relatively heavy. By way of contrast, a first object of the present invention is to provide a scaffolding board which is substantially lighter in weight, yet has sufficient stability to comply with the regulations.

In the journal entitled "Technische Rundschau" [Technical Review] No. 44–86 of 31.10.1986, P. 23 et seq., a large number of compound materials are described which may have numerous applications. In a certain number of cases, light-hardening single-component systems are utilisable which are offered as preimpregnated, semi-finished products. In the above-mentioned article, which summarises the prior art, this semi-finished product is employed to produce roller parts of a complex shape. A further object of the present invention is to provide a method and an apparatus for implementing the method, which permit such prepregs to be shaped simply, rapidly and accurately and scaffolding boards to be produced therefrom.

These objects are achieved with the scaffolding board, with the method and with the apparatus which are described in the claims.

The invention is explained more fully hereinafter with reference to one embodiment of an apparatus and with reference to the various operational steps for producing a scaffolding board.

FIGS. 7 to 12 illustrate six operational steps for producing a scaffolding board;

FIG. 13 is a plan view of a scaffolding board according to the invention;

FIG. 14 is a sectional view taken along the line XIV—XIV of FIG. 13;

FIG. 15 is a partial, longitudinal sectional view of the first embodiment of FIG. 13;

FIG. 16 is a modification of FIG. 15;

FIG. 17 is a partial, cross-sectional view, similar to FIG. 14, of the modification; and FIG. 18 illustrates a sealed edge of the scaffolding board on an enlarged scale.

Figure 6:
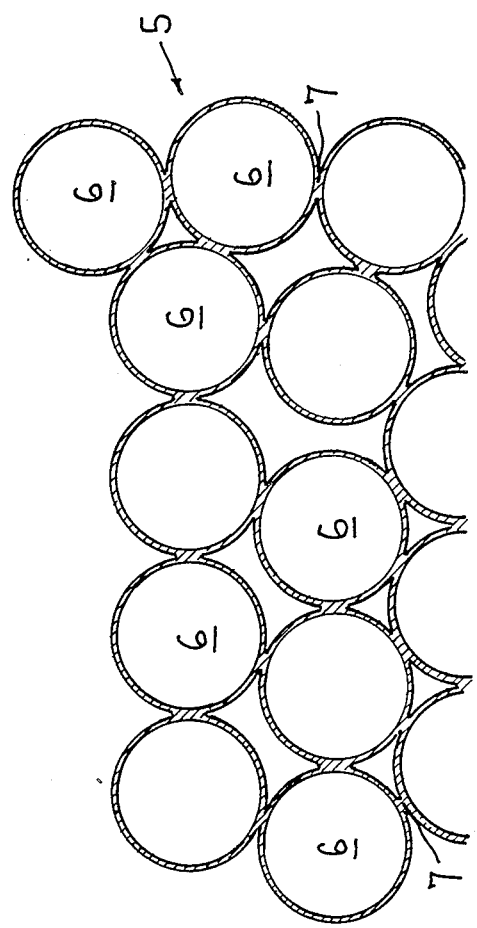
FIG. 6 is a schematic view, on an enlarged scale, of the construction of the apparatus shown in FIG. 1.

FIGS. 1 to 6 illustrate the construction of a lower mould portion 1 which comprises an edge 2 and a mould interior 3. The base 23 of the mould interior may be level, as in FIG. 3, or it may have longitudinal ribs 4 or grooving 24, as in FIG. 4. As indicated in the sectional views and more especially in FIG. 6, the lower mould portion 1 is formed from a porous material 5. This porous material may be formed, for example, from a mixture of granulated aluminium and resin, where the small granulated aluminium balls 6 may have diameters of from 0.5 mm to 4 mm, for example. In such a case, it has proved to be advantageous to use granules of different sizes and to provide finer granules internally, in the vicinity of the part to be shaped, than externally, as schematically illustrated by three layers in FIG. 5. To produce the lower mould portion, a mixture of granulated aluminium 6 and resin 7, substantially in a ratio of 1.5–1 to 0.2 depending on the diameter of the granulated aluminium, is introduced in a different mould and heated until the resin layer begins to melt and combines the granulated aluminium together in such a manner that spaces are produced, as indicated in FIG. 6, to achieve the desired permeability to air. Instead of using granulated aluminium, of course, other granules may also be used or, in special cases, even natural stone which is permeable to air may be used.

Figure 1:
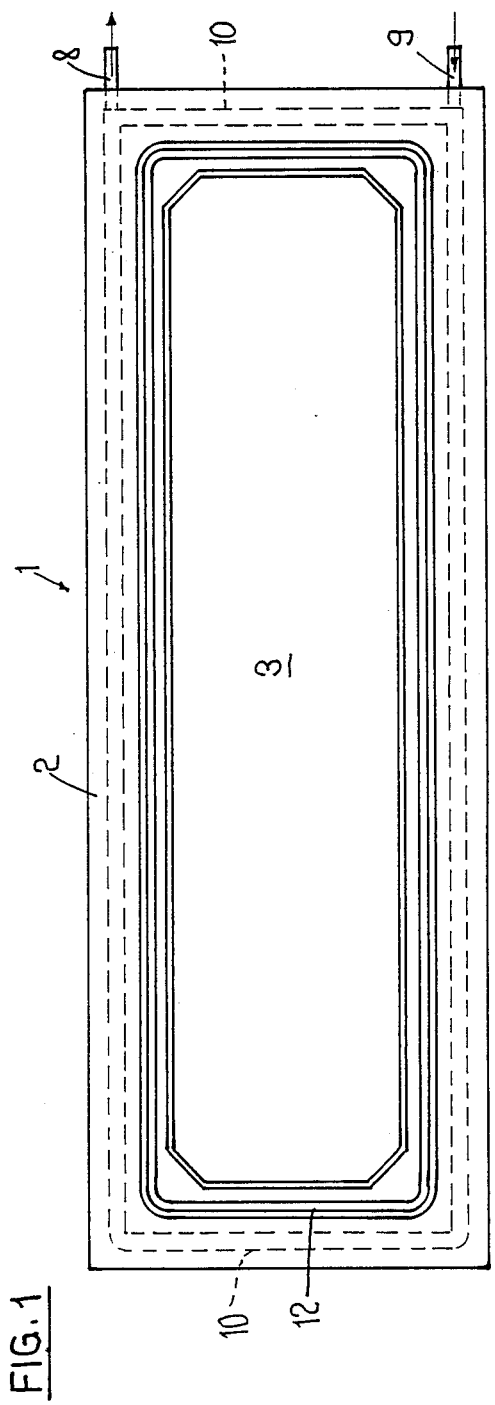
FIG. 1 is a plan view of the apparatus according to the invention.
Figure 2:
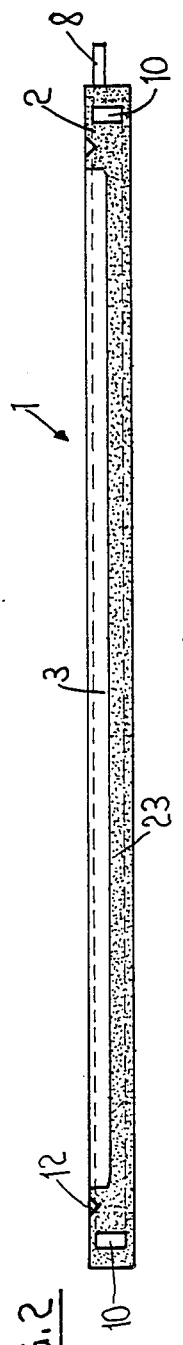
FIG. 2 is a longitudinal sectional view of FIG. 1.
Figure 3:
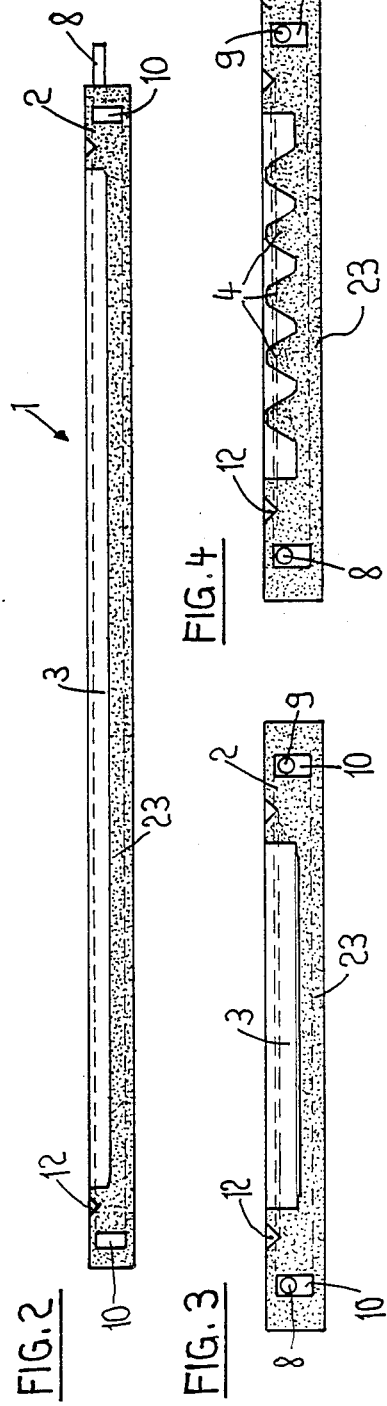
FIG. 3 is a cross-sectional view of FIG. 1 on a larger scale.
Figure 4:
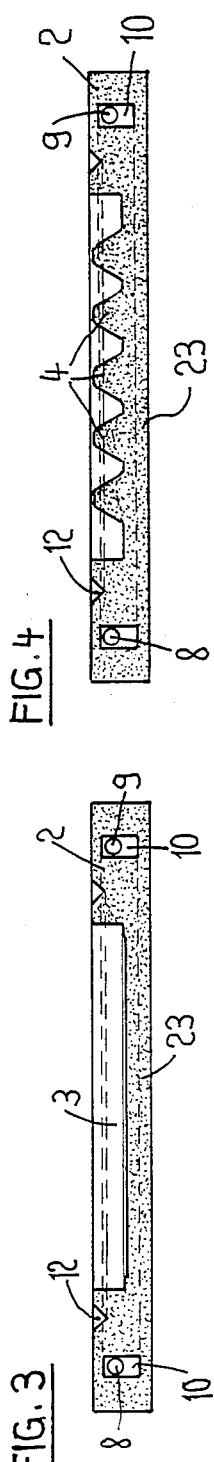
FIG. 4 illustrates a modification of FIG. 3.
Figure 5:
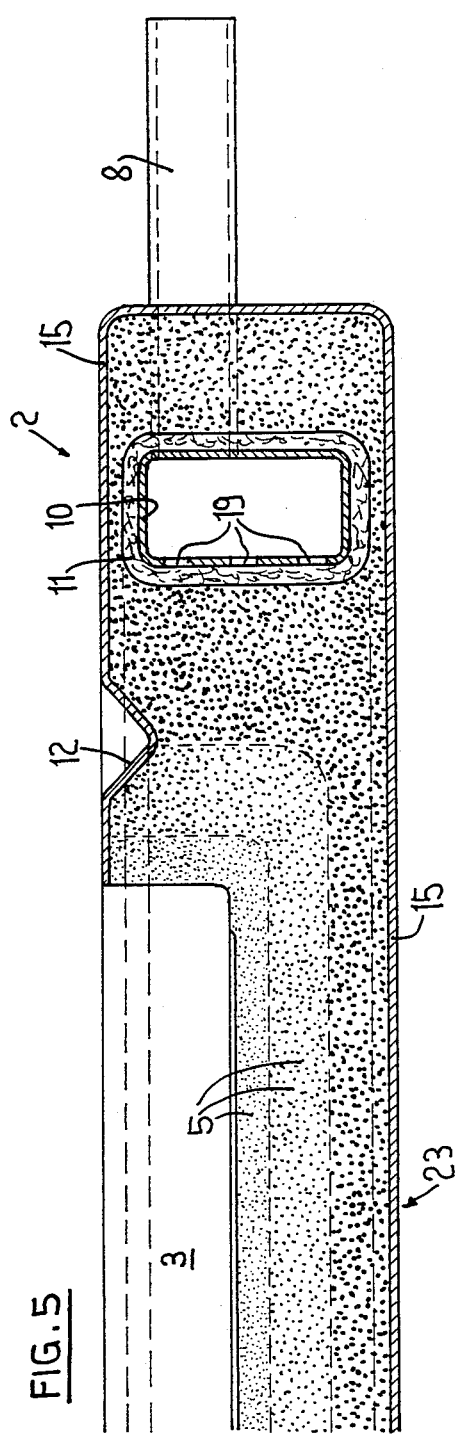
FIG. 5 illustrates an enlarged detail of FIG. 2.

The lower mould portion contains two inlet connections: one inlet connection for vacuum 8 and one inlet connection for compressed-air 9, see FIG. 1. Both inlet connections extend into an annular conduit 10 which is formed from a metal pipe having apertures 19 directed towards the mould interior, such a pipe being advantageously insulated by a glass-fibre mat 11 which is permeable to air. A circumferential groove 12, which is V-shaped, for example, is provided in the upper surface, and a circumferential press-ring 13 on the frame-like upper mould portion 14 engages in groove 12, see FIG. 7. The lower mould portion 1 is covered with an airtight casing 15 which envelops the entire lower mould portion, with the exception of the mould interior 3.

The use of the mould is explained hereinafter with reference to the production of a scaffolding board as shown in FIGS. 7 to 12 and 13 to 18. In the present case, a light-hardening, pre-impregnated semi-finished product—a prepreg with a glass-fibre roving—is used as the material. The material web 16 is placed upon the lower mould portion 1, and the upper mould portion 14 is closed in order to clamp the web through the press-ring. Subsequently, compressed-air is introduced through the inlet connection 9, so that the web portion arches. Simultaneously, the arched web portion is heated by a heat source 17 which may be a hot-air fan. Care must be taken to ensure that the temperature in the present case does not exceed 80° C. This heat causes the material to be stretched by about 60%. Subsequently, the vacuum source is connected to the inlet connection 8, see FIG. 10, and the heated and stretched material is deep-drawn through the vacuum. Since the material hardens with light, a source of ultra-violet light 18 is then connected, and the shaped part is thereby hardened. In the present case, and depending on the material, the hardening period lasts for 40 seconds. Subsequently, as shown in FIG. 12, the frame 14 is removed and the shaped part is removed from the mould by the introduction of compressed-air.

According to FIGS. 14 and 15, the scaffolding board 21 is formed from three box-shaped parts which are glued-together or, according to FIGS. 16 and 17, it is formed from two such parts which, in the mould shown in FIGS. 1 to 6, are moulded in the mould interior 3 and 4. For both modifications, the same upper portion 22 is manufactured in the mould interior 3, the base 23 of the mould having the grooving 24 which corresponds to the upper portion. Each of the transverse sides has an edge 25 serving to accommodate the fittings 26 which are secured by bolts 27. After the moulded and hardened part has been removed from the mould, the edges 20 which clamped and retained the part are trimmed.

The lower portion 28 of the board 21 is produced in a lower mould portion similar to the one used for the upper portion, but the surface does not need to be grooved. The reinforcing intermediate portion 29 is provided with corrugated longitudinal ribs 30 and produced with the mould interior 4. After the edges 20 of all three portions have been trimmed, those portions are glued together by known methods to produce the scaffolding board 21. FIG. 14 shows that the lateral surfaces of the upper portion and intermediate portion extend in the same direction, while the lateral surfaces of the base portion extend in the opposite direction to produce a closed box.

In the modification shown in FIGS. 16 and 17, the scaffolding panel 32 is only formed from two portions—the upper portion 22 with the grooving 24 and the intermediate or lower portion 29 with the longitudinal ribs 30. However, in this modification, the portion 29 with the longitudinal ribs 30 is inverted, i.e. it is connected to the upper portion with upwardly orientated lateral surfaces, so that a ribbed surface is produced outwardly and downwardly.

In order to achieve complete protection from moisture, a suitable composition 31 is additionally used to glue and seal the edges, see FIG. 18. Subsequently, the scaffolding board is provided with the fittings—any kind of fittings may be used—possibly by adaptation of the scaffolding board portions. Scaffolding boards, which are formed from a compound material with glass-fibres and have the required stability and tensile strength, as well as the same dimensions of approx. 2,500×600×50 mm as conventional wooden boards, weigh 14 kg as compared with conventional boards weighing 28 to 30 kg. Not only is such a reduction in weight of enormous advantage to people who have to construct scaffolding, but the transport costs are also reduced by half, especially in the case of large-scale structures. Attention should also be drawn to the fact that resistance to the effects of weather is greater than is the case with wood.

Instead of having the grooving as illustrated, the surface of the scaffolding board may have any other suitable form, and it is also possible to roughen the surface or provide it with an anti-slip coating.

I claim:

1. A scaffolding board formed from plastics material comprising an upper panel having side flanges forming a box-shaped member and a lower reinforcing box-shaped member which is provided with longitudinal ribs, wherein the upper and lower box-shaped members are fastened together.

2. A scaffolding board of claim 1 wherein the flanges of the lower reinforcing box-shaped member extend in a direction opposite to the flanges of the upper box-shaped member.

3. A scaffolding board formed from plastics material comprising an upper panel having side flanges forming a box-shaped member, an intermediate reinforcing box-shaped member which is provided with longitudinal ribs, and a lower panel having side flanges forming a box-shaped member wherein the box-shaped members are fastened together with the flanges of the upper and intermediate box-shaped members extending in the same direction which is opposite of that of the flanges of the lower box-shaped member.

4. The scaffolding board of any of claims 1, 2, 3, wherein the scaffolding board has a slip resistant surface.

5. The scaffolding board of any of claims 1, 2, 3, wherein the flanges are sealed.

6. The scaffolding board of any of claims 1, 2, 3, wherein the plastics material is a light hardening fibrous containing material.

7. The scaffolding board of any of claims 1, 2, 3, wherein the box-shaped members are fastened together by gluing.

* * * * *